Patented Nov. 23, 1937

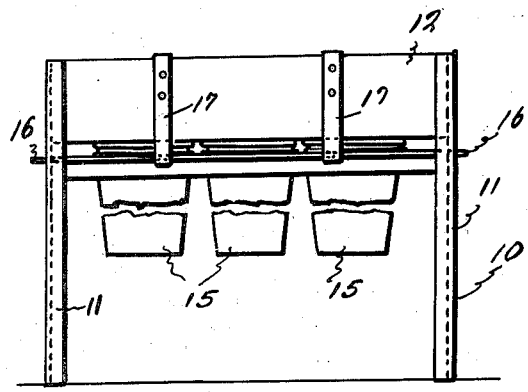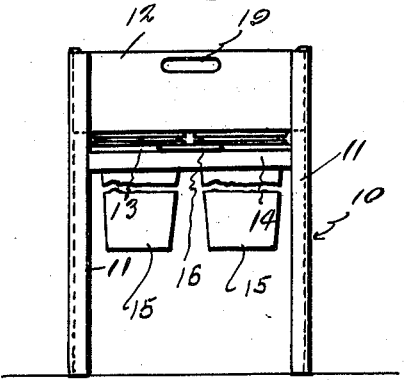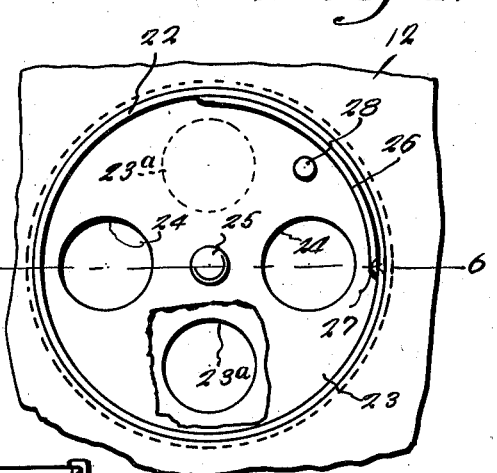

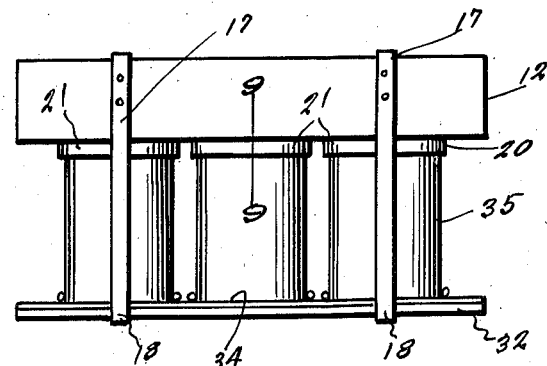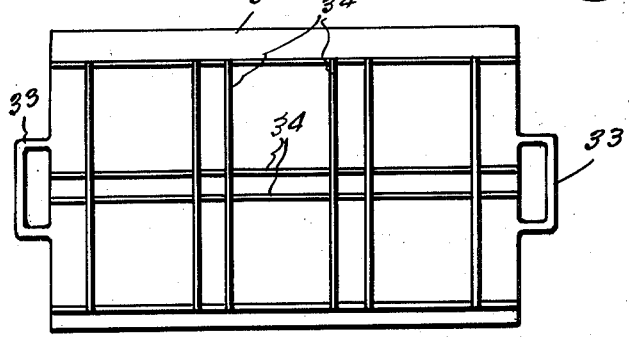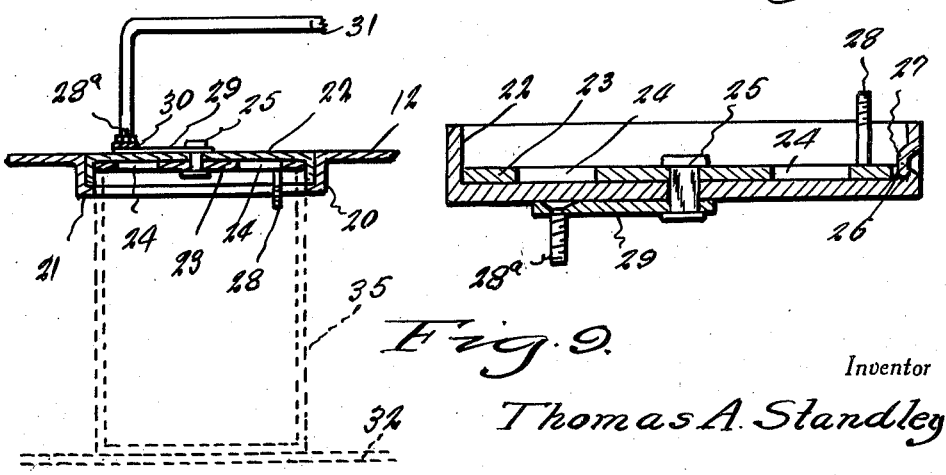

2,100,039

UNITED STATES PATENT OFFICE 2,100,039

CONTAINER FILLING APPARATUS

Thomas A. Standley, Dallas, Tex.

Application June 13, 1936, Serial No. 85,146

5 Claims. (Cl. 226—126)

This invention relates to a novel structural assemblage which may be unitarily and briefly referred to as an apparatus or device for filling simultaneously a plurality of containers, and has reference in particular to a structure expressly designed for filling cardboard cartons and the like with ice cream or a similar confection.

The invention is primarily designed for industrial purposes and therefore essentially usable in an ice cream manufacturing plant where different frozen delicacies are placed in pints, quarts, and similar cardboard cartons and containers for commercial purposes. I have discovered the need for an apparatus which is susceptible of accommodating a plurality of such cup-like cartons whereby it is possible to expeditiously charge these with liquid ice cream or the like and to thereafter remove them from the apparatus to be individually capped and made ready for the market.

Briefly, the preferred embodiment of the invention comprises a special assembling and holding rack for the multiplicity of containers, said rack being constructed for coordination with a pan-like companion unit which is in a sense a filling hopper, and said hopper being provided with a series of simultaneously operable valves permitting the flow of the contents from the pan into the containers to be regulated at the will of the attendant or operator.

One feature and advantage is predicated on the pan-like receptacle which is equipped with means whereby it may be detachably connected with the container holding rack or plate, and which is further provided with a series of rotary valves and a unitary operating frame or member therefor.

A further feature of the invention has to do with the adoption and use of an appropriate portable plate-like rack to accommodate in a systematic and orderly manner a series of cups, cartons, or the like which construction is such as to properly align the cartons with respect to the filling valves to permit the result to be accomplished in a reliable, sanitary and satisfactory manner.

Other and more specific details and features and advantages flowing therefrom will become more readily apparent from the following description and drawings.

In the accompanying drawings wherein like numerals are employed to designate like parts throughout the views:—

Figure 1 is a side elevation of a form of the invention including a leg-equipped stand.

Figure 2 is an end view of Figure 1 observing it in a direction from left to right.

Figure 3 is a top plan view of the same.

Figure 4 is a fragmentary top plan view showing one of the valve constructions.

Figure 5 is a cross section, on an enlarged scale, taken approximately on the plane of the line 5—5 of Figure 3.

Figure 6 is a detail cross section on the line 6—6 of Figure 4.

Figure 7 is an elevational view showing a modification with the rack and pan removed from the supporting stand.

Figure 8 is a top plan view of the type of rack or assembling and holding plate utilized in the arrangement shown in Figure 7.

Figure 9 is an enlarged detail fragmentary sectional and elevational view taken on the plane of line 9—9 of Figure 7.

Referring now to the parts of the structure by distinguishing reference numerals attention comes first to the portable stand which is preferably utilized as a part of the invention. It might be stated, however, that the use of this stand is optional since other supports might well be employed in connection with the essential parts of the structure to be hereinafter particularly described. This stand is, however, especially suited for the purposes intended and is denoted as a unit by the numeral 10. It comprises four duplicate vertical supporting legs 11 which lend themselves admirably well to accommodating the pan unit 12 and the associated detachable rack or plate 13. Spaced below the upper ends of the legs is a horizontal frame 14 which is attached to the legs and which constitutes a supporting ledge or base for the plate-like rack 13. The rack is of general rectangular form and so is the pan 12, and when the parts are connected together the structure as a unit can be easily slipped down into the protruding upper ends of the angle irons and rested on the supporting frame 14. Hence it will be seen that this particular type of a stand 10 is especially designed for use in connection with the features 12 and 13. The part 13 which is designated as the rack and which is in effect a hanger for the tapered cups 15 is a simple flat plate having a series of openings in which the cups 15 are hung somewhat in the manner indicated in Figure 5. If desired this rack may be provided with end handles or grips 16 to facilitate independent handling thereof. In practice the rack can be placed on the frame 14 as indicated in Figure 5 allowing the cups 15 to hang down through and below said frame. On the other hand the rack can be attached to the pan 12 before the two parts are placed in the stand. In this connection attention is called to the numerals 17 which designate spring straps connected to the opposite sides of the pan and provided at their lower ends with retaining hooks 18 to engage around or beneath the marginal edges of the rack 13. These form resilient clips to be detachably and operatively connect the pan with the rack in proper filling relationship. The arrangement is such as to expedite assembling and dis-assembling for filling and removal of the cartons, etc.

Considering now the detailed construction of the liquid ice cream containing and filling pan 12 it will be observed that this comprises a rectangular pan of appropriate depth having hand-holes or handles 19 at opposite ends to facilitate handling thereof. This pan is provided with a plurality of depending annular retaining elements 20 in registery with the filler openings. These elements are provided with inturned ledges 21 which serve to properly accommodate the two-part valve unit which fits removably and reversibly therein. It might be stated in this connection that there are any number of holes in the bottom of the pan and each hole is provided with a depending retaining annulus 20. The annulus in some instances fits telescopically into the carton and in other instances embraces the carton. For instance as shown in Figure 5 the annulus extends down into the upper mouth portion of the carton thus substantially filling the carton but not completely to the top.

Each valve assembly comprises a cup-like member 22 having diametrically opposite holes 23a therein as shown for example in Figure 4. Fitted within the rim of the cup is a rotary disk 23 having holes 24 for registry with the holes 23a. The disk is pivotally attached by a shaft or pin 25 to the apertured portion of the cup so that the respective holes can be aligned or dis-aligned as the case may be. Reference being had to Figure 4 it will be observed that the marginal edge portion of the disk is provided with a segmental notch 26 whose end portions function as stop shoulders to limit the rotation of the disk to align and dis-align the apertures 23a and 24 in an obvious substantially automatic manner. In this arrangement the rim portion of the cup member 22 is provided with an indentation or a detent 27 which as shown in Figure 6 fits into the notch and thereby limits the opening and closing action of the rotary disk. As shown better in Figure 6 the connecting and assembling pin 25 is polygonal in cross-sectional form so as to properly turn the disk in relation to the relatively stationary adapted cup 22. This complete unit is reversible from the position shown in Figure 5 to the position shown in Figure 9. To permit this to be accomplished it will be noted that the disk is provided on one side with an eccentric operating stud 28. On the other side is an equivalent operating stud 28a attached to the central pin 25 by way of a connecting and operating crank arm 29. Thus it matters not whether the cup 22 is right side up as shown in Figure 5 or turned upside down as shown in Figure 9 for under either condition either one or the other of the studs 28 or 28a is exposed for cooperation with the operating frame 30. This part 30 is of general rectangular form and has its end portions fashioned to provide suitable handles 31. The spaced parallel members thereof are attached to the respective rotary disk valve through the instrumentality of studs 28 or 28a as the case may be. Thus, assuming that the valves are closed and the pan 12 is filled with liquid "whip" or ice cream, it is placed in position as shown in Figure 5 so that the valved annular guides and retaining members fit telescopically down into the ice cream cups 15 hung in the movably supported rack 13. Then by grasping one of the handles 19 and operating the frame 30 in the proper direction this aligns or opens the valves allowing the ice cream to gravitate or flow down into the respective cups 15 when the valves are closed, the cups are disengaged and the rack 13 is exposed so that it can be lifted up bodily with the properly filled cups and the cups thereinafter removed to be put away in the refrigerator for final freezing and subsequent capping ready for the market.

As before indicated it is desirable to first place the rack 13 on the supporting frame 14 in the stand then the cups 15 are dropped down through the openings in the rack. Then the pan is placed down in the angle iron legs 11 in proper superposed relationship with the valves protruding into the upper ends of the cups. The clips 17 are engaged with the edge portions of the rack 13 and the whole structure is set for filling the various cups. Consequently opening or closing the valves will serve to regulate the fill of the cups and the pan can then be separated to permit the cups to be removed with or without the rack.

Reference being had in particular to Figures 1 to 5 of the drawings novelty is thought to reside in the provision of the stand comprising the angle iron legs 11 having the leg supporting frame 14 disposed on a plane below the upper ends of the legs so as to accommodate the collective unit constituting the filling pan or hopper 12 and the underlying cup supporting rack 13. The angle irons serve as guides to receive the superposed pan and rack as is evident. It will be noted too that the marginal edge portions of the rack or plate 13 project beyond the ledge supporting frame 14 to accommodate hooked ends 18 of the external easily available latches or clips 17. In the arrangement shown in Figure 5 tapered cups or receptacles 15 are shown and the valves extend into the upper ends of the cups.

In the arrangement shown in Figure 7 the essential difference is that I employ a slightly different type of rack. This is denoted by the numeral 32 and comprises an imperforate plate having suitable handles 33 at opposite ends. A series of intersecting wires 34 cooperate with the plate in forming appropriate accommodation means for the cylindrical type of carton 35 shown in Figure 7. That is to say the wires 34 are mounted on the top of the plate 32 as to provide individual holders for the cylindrical type cartons 35. As shown in Figure 9 when cylindrical cartons are used the upper ends thereof extend up through the annular retaining members 20. Then the valve unit comprising the disk and its cup is inverted, the disk in the valve being controlled through the instrumentality of the crank arm 29 and the attaching stud 28 which is connected with the operating frame 30. It is evident of course that the valve means is a duplicate of that shown in Figure 5 except that it is inverted. The pan and latch devices are substantially the same as already described and the only difference in this embodiment is in the rack or plate 32 and the accommodation means 34 for the cup 35. Otherwise the principle of construction is generically the same as that already described.

It is thought that persons skilled in the art to which the invention relates will be able to obtain a clear understanding of the invention after considering the description in connection with the drawings. Therefore, a more lengthy description is regarded as unnecessary.

Minor changes in shape, size and the arrangement of details coming within the field of invention claimed may be resorted to in actual practice, if desired.

I claim:—

1. In a structural assemblage of the class described, an apertured plate adapted to accommodate a plurality of ice cream or similar cups, an ice cream containing and carton charging pan of general rectangular form, said rack plate being also of rectangular form and disposed in parallelism beneath the bottom of said pan, resilient assembling hooks carried by the marginal portion of the pan and releasably engageable with the marginal edges of said plate, the bottom of said pan being provided with a plurality of openings provided with depending annular carton retaining elements, individual valves mounted in said depending annular retaining elements, and a single operating frame mounted in the pan and having operating connection with the valves for simultaneously controlling the valves.

2. As a component part of a structural assemblage of the class described, a reversible valve unit comprising a cup having an apertured disc-like bottom, a rotary apertured valving disc mounted within the rim of the cup and in contact with said bottom, a lateral operating stud attached to said disc to operate the disc from one side of the cup, and a crank arm located on the outside of the cup and having operating connection with the disc in the manner and for the purposes described.

3. In a pan of the class described, a receptacle, a plurality of openings provided with depending annular carton retaining elements, said elements having inturned ledges, and valve units supported in said annular elements, each valve unit including a cup with apertures and a rotary disk plate registerable therewith, the disk plate being provided with operating members and a single operating frame connected with said operating members in the manner and for the purposes described.

4. In a structural assemblage of the class described, a portable stand including a plurality of vertical legs in the form of angle irons, an angle iron frame attached horizontally to the upper end portions of said legs at a point spaced below the upper ends to serve as a rack supporting ledge, a filling pan provided with a plurality of marginal depending retaining latches, said pan being provided in its bottom with a plurality of valved filler openings with which cartons are adapted to register, an apertured carton assembling and rack plate, said latches being releasably engageable with the marginal edges of said plate, said plate resting on said ledge forming frame, said pan having its corner portions fitting within the confines of the projecting upper ends of said legs, whereby to facilitate insertion and removal of the combined pan and rack in the manner and for the purposes described.

5. In a structural assemblage of the class described, an ice cream containing carton charging pan, said pan being provided in its bottom with a plurality of openings having aligned depending annular carton retaining elements, said elements being provided with inturned valve unit supporting ledges, a plurality of individual valve units mounted in said annular retaining elements and removably seated on said ledges, unitary means in said pan for simultaneously opening and closing said valve units, a carton supporting plate, and a plurality of resilient hooked latches carried by said pan and releasably engageable with said plate to maintain the plate and pan in spaced parallelism.

THOMAS A. STANDLEY.